United States Patent
Milne et al.

(10) Patent No.: US 10,419,870 B1
(45) Date of Patent: Sep. 17, 2019

(54) APPLYING AUDIO TECHNOLOGIES FOR THE INTERACTIVE GAMING ENVIRONMENT

(71) Applicants: Sony Corporation, Tokyo (JP); Sony Interactive Entertainment LLC., San Mateo, CA (US)

(72) Inventors: James R. Milne, Ramona, CA (US); True Xiong, San Diego, CA (US); Charles David McCoy, San Diego, CA (US); Gregory Peter Carlsson, Santee, CA (US)

(73) Assignees: Sony Corporation, Tokyo (JP); Sony Interactive Entertainment LLC, San Mateo, CA (US)

( * ) Notice: Subject to any disclaimer, the term of this patent is extended or adjusted under 35 U.S.C. 154(b) by 1 day.

(21) Appl. No.: 15/951,437

(22) Filed: Apr. 12, 2018

(51) Int. Cl.
*H04S 7/00* (2006.01)
*H04S 3/00* (2006.01)
(Continued)

(52) U.S. Cl.
CPC .............. *H04S 7/304* (2013.01); *A63F 13/21* (2014.09); *A63F 13/23* (2014.09); *A63F 13/428* (2014.09);
(Continued)

(58) Field of Classification Search
CPC .. H04S 2420/01; H04S 7/303; H04S 2400/11; H04S 1/002; H04S 7/304; H04S 2400/01; H04S 7/305; H04S 3/008; H04S 1/007; H04S 2400/15; H04S 7/30; H04S 3/00; H04S 3/004; H04S 5/00; H04S 5/005; H04S 7/00; H04R 5/027; H04R 2499/13; H04R 5/02; H04R 1/345; H04R 2217/03;
(Continued)

(56) References Cited

U.S. PATENT DOCUMENTS

| 8,160,282 B2 * | 4/2012 | Christoph | H04S 7/301 381/310 |
| 9,037,468 B2 * | 5/2015 | Osman | H04S 7/304 704/270 |

(Continued)

OTHER PUBLICATIONS

Dimitri Singer, "3D Sound Labs HRTF technology for 3D Audio rendering to be integrated in the upcoming VLC 3.0 media player", 3D Sound Labs, Dec. 20, 2017.

(Continued)

*Primary Examiner* — Lun-See Lao
(74) *Attorney, Agent, or Firm* — John L. Rogitz

(57) ABSTRACT

Personalized HRTFs for each of plural computer game participants are convolved with functions representing the acoustics of a physical room in which each participant is located or representing the acoustics of a virtual space in the game environment. Head-tracking of each participant may be employed as the game is played and the HRTFs established accordingly. As the game progresses, the location of each player's character within the virtual game space with respect to the other players is tracked and audio adjusted accordingly. If desired, audio can be down-mixed from, e.g., 5.1 audio and then up-rendered for each player by the game console or by the players' local game interface, e.g., a computer game head-worn visor assembly.

21 Claims, 11 Drawing Sheets

(51) Int. Cl.
*A63F 13/23* (2014.01)
*A63F 13/21* (2014.01)
*A63F 13/428* (2014.01)

(52) U.S. Cl.
CPC ........ *H04S 3/008* (2013.01); *A63F 2250/497* (2013.01); *A63F 2300/1012* (2013.01); *A63F 2300/1025* (2013.01); *G10H 2210/375* (2013.01); *H04S 2400/01* (2013.01); *H04S 2400/03* (2013.01); *H04S 2400/11* (2013.01); *H04S 2420/01* (2013.01)

(58) Field of Classification Search
CPC .... H04R 2499/11; H04R 1/023; H04R 1/403; H04R 1/406; H04R 2201/023; H04R 2201/025; H04R 2201/401; H04R 2225/021; H04R 2225/025; H04R 2410/05
USPC ....... 381/1, 17, 18, 300, 303, 302, 309, 310, 381/74, 98, 86
See application file for complete search history.

(56) References Cited

U.S. PATENT DOCUMENTS

| | | | |
|---|---|---|---|
| 9,648,439 B2* | 5/2017 | Cartwright | H04S 7/30 |
| 9,848,273 B1 | 12/2017 | Helwani et al. | |
| 10,003,905 B1* | 6/2018 | Milne | H04R 5/04 |
| 2012/0008806 A1* | 1/2012 | Hess | H04R 1/023 |
| | | | 381/302 |
| 2013/0202117 A1* | 8/2013 | Brungart | H04R 5/04 |
| | | | 381/17 |
| 2014/0328505 A1* | 11/2014 | Heinemann | H04S 7/303 |
| | | | 381/303 |
| 2016/0243445 A1* | 8/2016 | Lovitt | A63F 13/00 |

OTHER PUBLICATIONS

Will Freeman, "Making Immersive Audio for VR", mcvuk.com, Jan. 12, 2015.

\* cited by examiner

APPLYING AUDIO TECHNOLOGIES FOR THE INTERACTIVE GAMING ENVIRONMENT

FIELD

The present application relates generally to applying audio technologies for the interactive gaming environment.

BACKGROUND

Computer game environments provide immersive experiences for multiple players. The more realistic the experience, the more agreeably immersive it is for the gamers. As understood herein, this applies not only to video but audio as well.

SUMMARY

As understood herein, in a gaming environment, multiple players may be involved, and it is therefore desirable to create individual immersive experiences including individual audio experiences for each player. Present principles understand that this goal can be promoted by virtually moving the gaming audio sound out of the head (between the ears) of a gamer, e.g., a gamer using headphones, using head-related transfer functions (HRTF) for each individual gamer.

Accordingly, a system includes at least one computer medium that is not a transitory signal and that in turn includes instructions executable by at least one processor to access at least a first set of head related transfer functions (HRTF) tailored to a first person. Each HRTF is associated with a pose of the first person. The instructions are executable to identify a pose of the first person, and to identify a first HRTF of the first set of HRTF based at least in part on the identification of the pose of the first person. The instructions also are executable to access at least a second set of HRTF tailored to a second person, with each HRTF being associated with a pose of the second person, identify a pose of the second person, and identify a first HRTF of the second set of HRTF based at least in part on the identification of the pose of the second person. Furthermore, the instructions are executable to convolute an audio stream using the first HRTF of the first set of HRTF to render a first adjusted stream and to convolute the same audio stream using the first HRTF of the second set of HRTF to render a second adjusted stream. The instructions are executable to provide the first adjusted stream to at least one audio speaker of a first playback device associated with the first person and provide the second adjusted stream on at least one audio speaker of a second playback device associated with the second person.

In some examples, the first set of HRTF is for a first ear of the first person, the at least one audio speaker is a first speaker, the first adjusted stream is a first ear adjusted stream, and the instructions are executable to access at least a second set of HRTF tailored to the first person. Each HRTF in the second set that is tailored to the first person is associated with a pose of the first person. The instructions are executable to identify a first one of the second set tailored to the first person based at least in part on the identification of the pose of the first person, convolute the audio stream using the first one of the second set tailored to the first person to render a second ear adjusted stream, and play the second ear adjusted stream on at least one second audio speaker.

The system can include the processor and the at least one speaker.

In non-limiting examples, the instructions can be executable to concatenate the first one of the first set of HRTF with a HRTF associated with a space to render a concatenated HRTF. In such embodiments, the instructions may be executable to convolute the audio stream using the concatenated HRTF to render the first adjusted stream. The space can be a virtual space of a computer game or it can be a physical space.

The computer medium can be in a game source such as a game console. Or, the at least one computer medium can include a first computer medium in the first playback device and a second computer medium in the second playback device, in which case and the instructions of the first computer medium may be executable to access at least the first set of HRTF, identify the pose of the first person, identify the first HRTF of the first set of HRTF, convolute the audio stream using the first HRTF of the first set of HRTF to render the first adjusted stream, and play the first adjusted stream on at least one audio speaker of the first playback device. In such a case, the instructions of the second computer medium can be executable to access at least the second set of HRTF, identify the pose of the second person, identify the first HRTF of the second set of HRTF, convolute the audio stream using the first HRTF of the second set of HRTF to render the second adjusted stream, and play the second adjusted stream on at least one audio speaker of the second playback device.

In another aspect, a system includes at least one computer medium that is not a transitory signal and that in turn includes instructions executable by at least one processor to access at least a first set of head related transfer functions (HRTF) tailored to a first person. The instructions are executable to select at least a first one of the first set of HRTF and concatenate the first one of the first set of HRTF with a HRTF associated with a space to render a first concatenated HRTF. Also, the instructions can be executed to concatenate a first one of a second set of HRTF tailored to a second person with the HRTF associated with a space to render a second concatenated HRTF. The instructions are executable to down-render an audio stream from N channel, with N>3, to stereo and convolute the stereo using the first concatenated HRTF to render a first adjusted stream. Similarly, the instructions may be executable to convolute the stereo using the second concatenated HRTF to render a second adjusted stream. The instructions are executable to provide the first adjusted stream to a first playback device and provide the second adjusted stream to a second playback device.

In another aspect, a method implemented by a video game device includes identifying at least one music genre preferred by a computer gamer:

identifying, for a first scene in the video game, a first tempo. The method includes, based at least in art on identifying the first tempo, establishing a first music mix using music in the at least one music genre having tempo correlated to the first tempo and playing the first music mix during presentation of the first scene. The method also includes identifying, for a second scene in the video game, a second tempo. The method includes, based at least in art on identifying the second tempo, establishing a second music mix using music in the at least one music genre having tempo correlated to the second tempo, and playing the second music mix during presentation of the second scene.

The details of the present application, both as to its structure and operation, can be best understood in reference to the accompanying drawings, in which like reference numerals refer to like parts, and in which:

DETAILED DESCRIPTION

Figure 1:
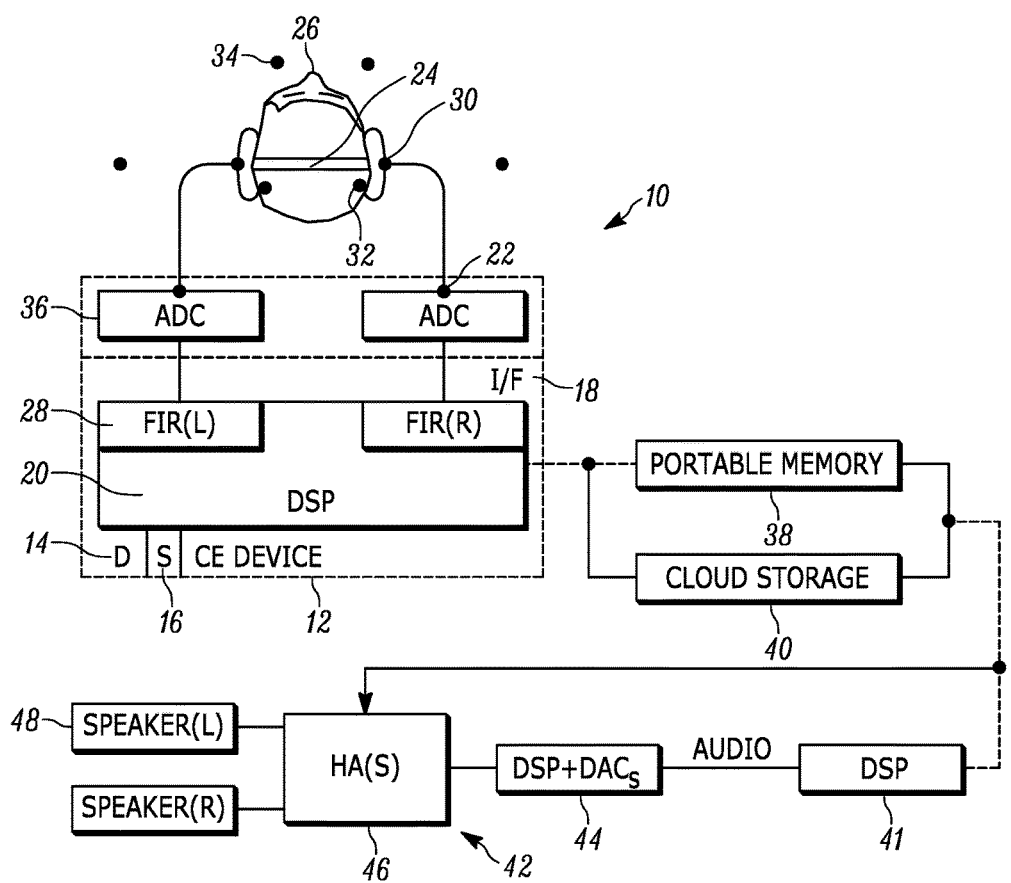
FIG. 1 is a block diagram of an example head-related transfer function (HRTF) recording and playback system.

In overview, personalized HRTFs for each of plural computer game participants may be stored locally or on network storage ("in the cloud"). U.S. patent application Ser. No. 15/822,473, owned by the present assignee and incorporated herein by reference, sets forth details of deriving personal orientation-dependent HRTFs for individuals. During game play, the HRTFs can be convolved with functions representing the acoustics of a physical room in which each participant is located or representing the acoustics of a virtual space in the game environment. Head-tracking of each participant may be employed as the game is played and the HRTFs established accordingly. Both the above-incorporated U.S. patent application Ser. No. 15/822,473 and U.S. patent application Ser. No. 15/402,539, also incorporated herein by reference, sets forth details of a head orientation tracking apparatus consistent with present principles.

As the game progresses, the location of each player's character within the virtual game space with respect to the other players is tracked and audio adjusted accordingly. If desired, audio can be down-mixed from, e.g., 5.1 audio and then up-rendered for each player by the game console or by the players' local game interface, e.g., a computer game head-worn visor assembly. U.S. Pat. Nos. 9,826,332 and 9,924,291, both incorporated herein by reference, discuss up-rendering and down-rendering principles that may be used in this regard consistent with present principles.

The audio playback apparatus for all game participants may receive the same radio signal but each apparatus may decode it differently based on the participant's location and HRTF, which HRTF may further depend on head tracking to account for the orientation of the player's head. Audio in N-channel, with N>3, may be down-rendered to stereo, transmitted in stereo to save bandwidth to game participants, and then up-rendered from stereo to N-channel, such as 5.1 audio.

With the above overview in mind, this disclosure accordingly relates generally to computer ecosystems including aspects of computer game ecosystems. A system herein may include server and client components, connected over a network such that data may be exchanged between the client and server components. The client components may include one or more computing devices that have audio speakers including audio speaker assemblies per se such as computer game headsets and also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone. C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computer game console in combination with a display device such as an integral display or a TV. The CE device 12 may be implemented by a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include or communicate with one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-described HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described further below, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line) and/or on the DSP/amplifier module of the playback device, with the person 26 being given the portable memory 38 or access to the cloud storage 40 so as to be able to load (as indicated by the dashed line) his personalized HRTF into a receiver such as a digital signal processor (DSP) 41 of playback device 42 of the end user. A playback device may be implemented by a computer game headset and may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by applying a finite element method (FEM), finite difference method (FDM), finite volume method, and/or another numerical method, using 3D models to set boundary conditions.

Figure 2:
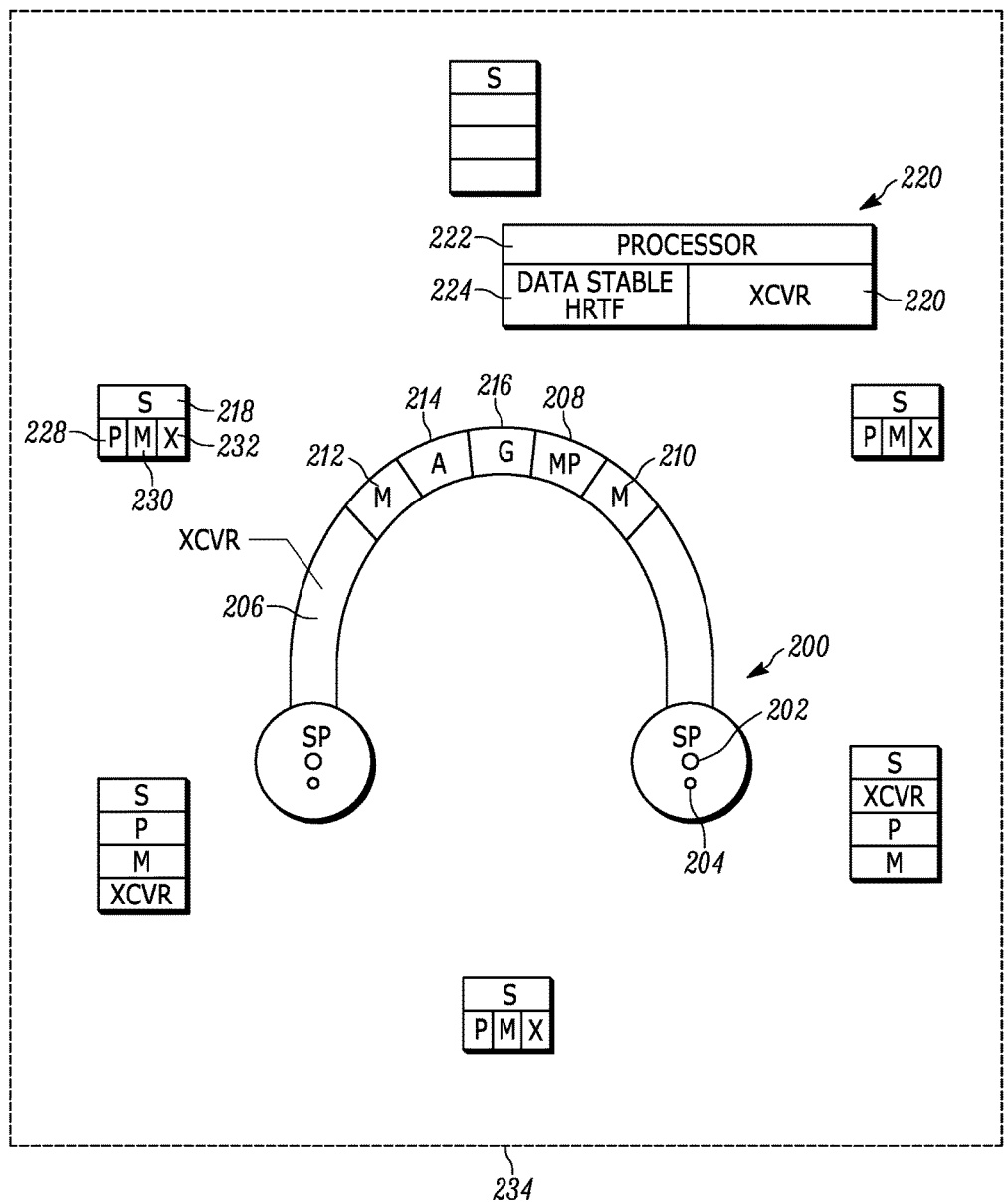
FIGS. 2 and 3 are block diagrams of example HRTF recording systems.
Figure 3:
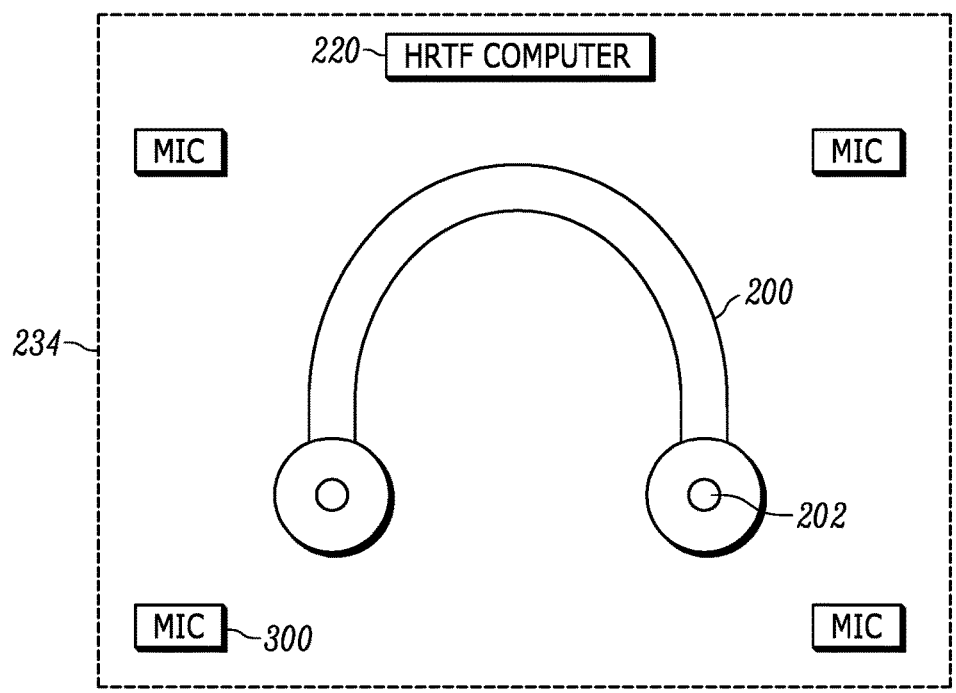

FIGS. 2 and 3 show respective HRTF file generation systems. In FIG. 2, a person (not shown) may wear headphones 200 with left and right earphone speakers 202. In lieu of or adjacent to each speaker 202 may be a respective microphone 204 for playing HRTF calibration test tones.

In the example shown, the headphones 200 may include one or more wireless transceivers 206 communicating with one or more processors 208 accessing one or more computer storage media 210. The headphones 200 may also include one or more motions sensors communicating with the processor. In the example shown, the headphones 200 include at least one magnetometer 212, at least one accelerometer 214, and at least one gyroscope 216 to establish a nine-axis motion sensor that generates signals representing orientation of the head of the wearer of the headphones 200. U.S. Pat. Nos. 9,448,405 and 9,740,305, owned by the present assignee and incorporated herein by reference, describes a nine-axis orientation measuring system in a head-mounted apparatus.

While all nine axes may be used to determine a head orientation for purposes to be shortly disclosed, in some embodiments, recognizing that sound varies the most as a person moves his head in the horizontal plane, motion in the vertical dimension (and concomitant sensor therefor) may be eliminated for simplicity.

In the example of FIG. 2, test tones from one or more speakers 218 may be played and picked up by the microphones 204, and signals from the microphones 204 may be sent via the transceiver 206 or through a wired connection to a HRTF generation computer 220, which typically includes a processor 222, computer storage 224, and communication interface 226, as well as other appropriate computers such as any described herein. Also, each speaker 218 may include a speaker processor 228 accessing speaker computer storage 230 and communicating via wired or wireless links with the computer 220 via a communication interface 232. In the example shown, test tones or other test sounds are generated by plural speakers surrounding the headphones 200 within a space 234. The space 234 may be a room of the end user's dwelling, with HRTF files being generated for each room and then the HRTF file corresponding to a room in which the end user wishes to listen to audio being selected. Or, the space 234 may be an anechoic-coated or other special sound recording room. Yet again, to generate the venue-specific HRTF described below that is independent of a person and later concatenated with a person's HRTF, the space 234 may be the venue itself, e.g., Carnegie Hall, Sadler's Wells, Old Vic, the Bolshoi theater, etc. U.S. Pat. No. 8,787,584, owned by the present assignee and incorporated herein by reference, describes a method for establishing HRTF files to account for the size of a human head. U.S. Pat. No. 8,520,857, owned by the present assignee and incorporated herein by reference, describes a method for determining HRTF. This patent also describes measuring a HRTF of a space with no dummy head or human head being accounted for.

In FIG. 2, the end user wearing the headphones 200 may be asked to orient his head at a first orientation, with coefficients of a first FIR filter being determined at that orientation, and then may be asked to reorient his head at a second orientation, with coefficients of a second filter being determined at that second orientation, and so on for plural orientations. The filters together establish the HRTF file. Or, the user may be instructed to remain motionless and the speakers 218 moved to generate the first, second . . . $N^{th}$ filters. If desired, the techniques described in U.S. Pat. No. 9,118,991, owned by the present assignee and incorporated herein by reference, may be used to reduce the file size of HRTF files.

FIG. 3 illustrates an embodiment that in all essential respects is identical to that of FIG. 2, except that instead of test audio being played on external speakers and picked up on microphones in the headphones 200, test audio is played on the speakers 202 of the headphones 200 and picked up by one or more microphones 300 that are external to the headphones 200 and in communication with the HRTF computer 220.

Figure 4:
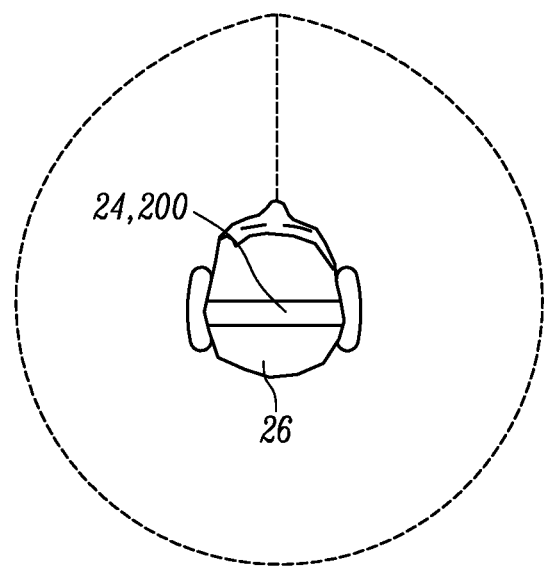
FIGS. 4 and 5 are schematic diagrams illustrating that HRTF files may be generated for plural head orientations.
Figure 5:
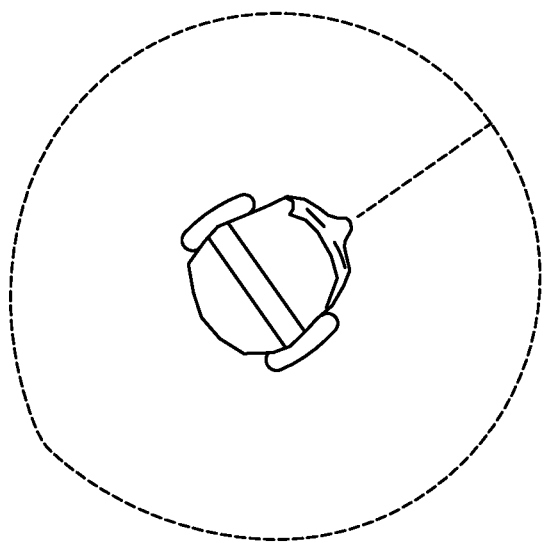

FIGS. 4 and 5 illustrate that the person 26 shown in FIG. 1 wearing the headphones 24 or 200 described previously may be instructed to orient his head in a first orientation (FIG. 4), at which a first FIR filter is generated. The first orientation may be looking straight ahead as shown. The person may then be instructed to turn his head to a second orientation (FIG. 5) at which the person is looking obliquely to straight ahead as shown, and a second FIR filter derived at the second orientation. Multiple FIR filters can be generated in this way, one for each step of orientation (e.g., one FIR filters for every two degrees of azimuth of head orientation). Note that the step of orientation may not be constant. For example, within 10 degrees of straight ahead, one filter may establish every one degree of orientation change, whereas beyond that sector, one filter may be established every three degrees of orientation.

Figure 6:
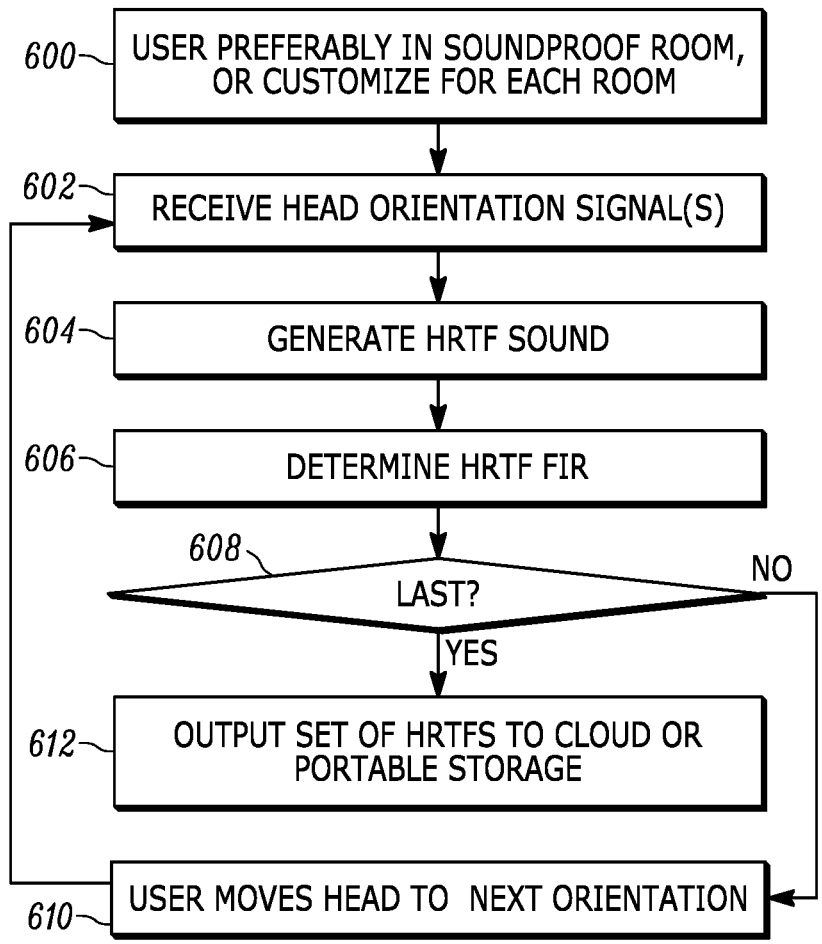
FIG. 6 is a flow chart of example HRTF recording and use logic consistent with present principles.

FIG. 6 illustrates the HRTF generation logic described above. At block 600 the user for whom the HRTF files are being personalized may be located in a sound proof room, or in a room of the user's dwelling. Proceeding to block 602, signals from the headphones indicating the orientation of the person's head are received and at that orientation HRTF test sound is generated at block 604. Based on signals from the microphones that capture the test sound, at block 606 a FIR filter is generated for the head orientation at block 602 and associated therewith in storage. If the last desired orientation to derive a FIR filter is determined to have been measured at decision diamond 608, the HRTF file (with multiple FIR filters and corresponding head orientations) is output at block 612 consistent with principles above. Otherwise, the next orientation is established at block 610 and the process loops back to block 602.

Figure 7:
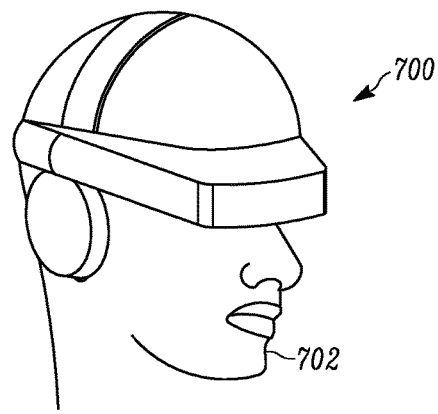
FIG. 7 is a perspective view of an example computer game headset.

For game play, each individual for whom a set of HRTFs has been established in accordance with, for example, FIGS. 2-6 above, may play a computer game with other participants also having their own sets of HRTFs. This typically may be done by donning a computer game headset 700 as shown in FIG. 7, which is worn on the head of an individual 702.

Figure 8:
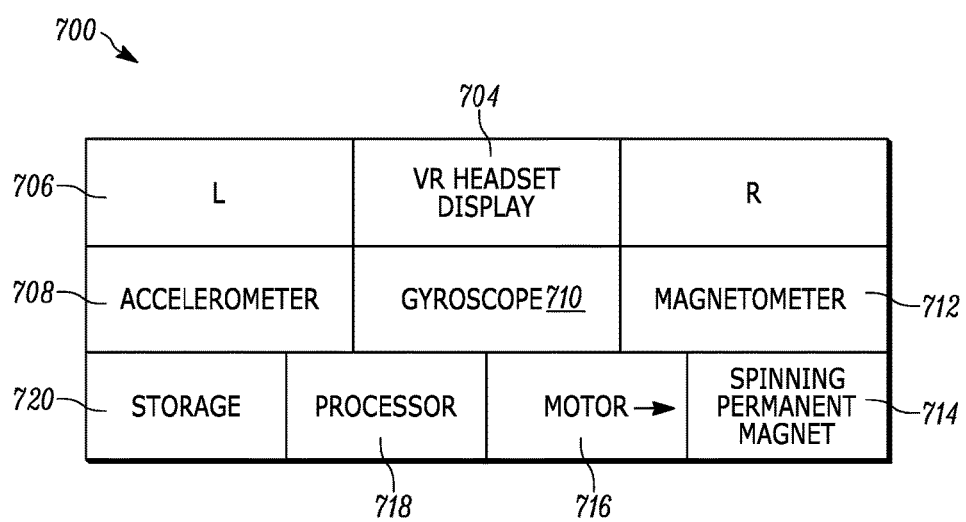
FIG. 8 is a block diagram of internal components of an example headset.

FIG. 8 shows components of an example headset 700, further details of which are set forth in the above-incorporated U.S. patent application Ser. No. 15/402,539. The example headset 700 may be used to determine pose information related to the player. "Pose information" typically can include orientation in space as well as location in space.

The headset 700 may include a headset display 704 for presenting demanded images, e.g., computer game images. The headset 700 may also include one or more audio speakers such as left and right speakers 706 typically implemented within earpieces of the headset 700. Additional speakers may be implemented for, e.g., 5.1 audio if desired.

The headset 700 may also include an accelerometer 708 with three sub-units, one each for determining acceleration in the x, y, and z axes in Cartesian coordinates. A gyroscope 710 may also be included to, e.g., detect changes in orientation over time to track all three rotational degrees of freedom. While the headset 700 may exclude the accelerometer and/or gyroscope and rely only on a magnetometer 712 as described in the incorporated patent application, the accelerometer (and/or gyroscope) may be retained as it is very fast compared to the magnetometer. Retaining these sensors further can be used as described further in U.S. patent application Ser. No. 15/402,539 to enhance performance and precision using sensor fusion.

The magnetometer 712 typically includes a magnetic field sensor. In addition to or in lieu of a magnetometer sensor per se, the sensor may be implemented by a Hall effect sensor or other appropriate magnetic field sensor. However, the sensor is physically embodied, it measures the magnetic field generated by a spinning permanent magnet 714 such as a horseshoe-shaped, bar-shaped, or other appropriately shaped magnet implemented by Iron or a rare earth material such as Neodymium. For example, the magnet 714 may be made of neodymium iron boron (NdFeB), or samarium cobalt (SmCo), or alnico, or ceramic, or ferrite.

To spin the magnet 714 about an axis, a motor 716 is coupled to the magnet. A processor 718 accessing instructions on a computer memory 720 may receive signals from the magnetometer, accelerometer, and gyroscope and may control the motor and display/speakers and/or feed pose data to different consumers, e.g., partner garners. In accordance with U.S. patent application Ser. No. 15/402,539, the processor 718 may determine aspects of pose information using the signals from the magnetometer and may also communicate with another computer such as but not limited to a computer game console using any of the wired or wireless transceivers shown in FIG. 1 and described above, including communication of the pose information to the other computer. In some embodiments the data from the magnetometer may be uploaded to a remote processor that executes the logic.

Figure 9:
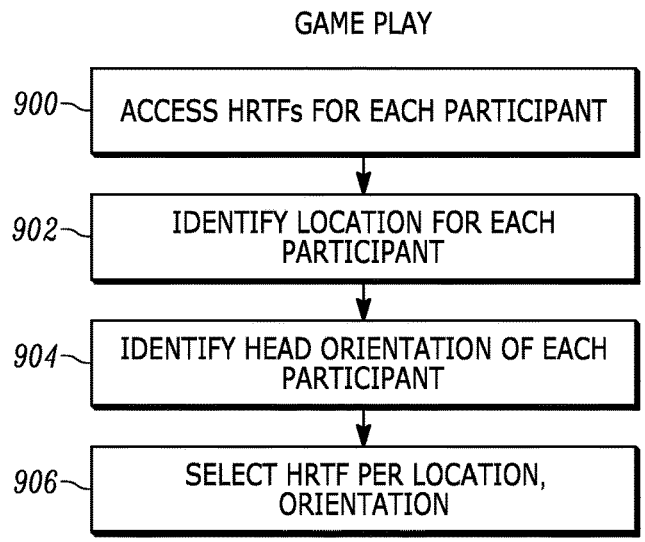
FIG. 9 is a flow chart of example logic for producing audio in a headset based on game character location within a computer game space or physical space.

Once each gamer has been associated with his own HRTFs and has donned a headset for game play such as the headset 70X) shown in FIG. 7, computer game play may commence as shown in FIG. 9 at block 900 by accessing HRTFs for each participant, either from local storage or cloud storage as described. That is, the HRTFs may be accessed by engaging the portable media 38 with the playback device 42, by accessing cloud storage 40 and linking the HRTF files thereon to the playback device 42, etc.

During game play, the location of each player is identified at block 902 using, e.g., the sensors in the headsets, which may include absolute location sensors such as global positioning satellite (GPS) sensors. Or, the location of the gamer's character within the game environment as indicated by the game console executing the game may be accessed as the location of the gamer at block 902.

Moving to block 904, the hear orientation or pose information of each gamer may be identified using any of the techniques described herein. Based on the pose information and if desired on the location, for each game participant a HRTF is selected at block 906, and the corresponding FIR filter from the HRTF files selected for the sensed orientation.

Figure 10:
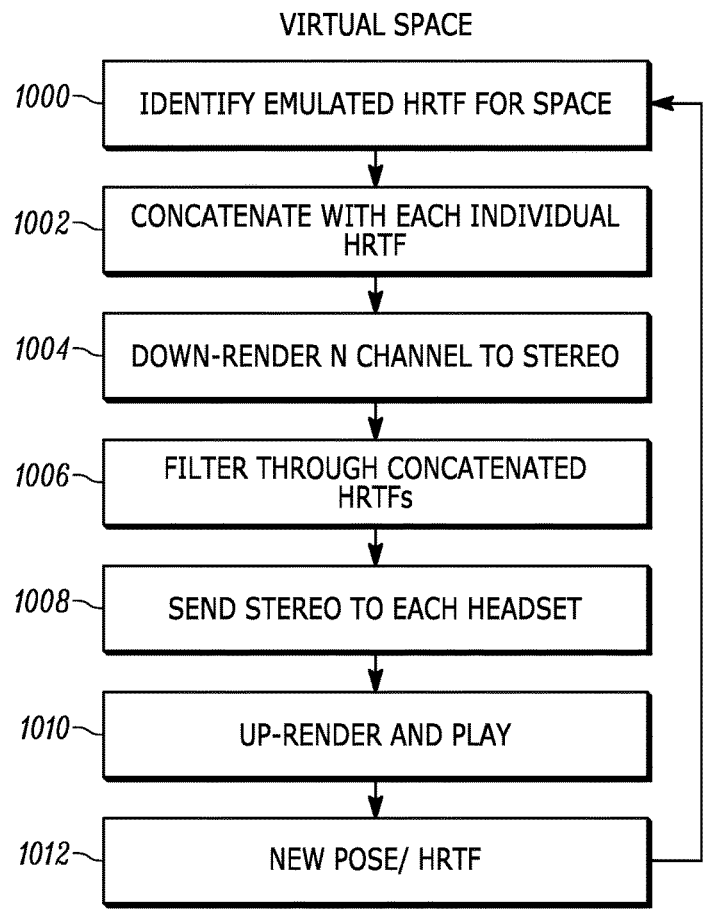
FIG. 10 is a flow chart of example logic continuing from FIG. 9 that is game console-centric for a computer game space.

FIG. 10 illustrates a first example of implementing the HRTFs selected at block 906 in FIG. 9. At block 1000 an emulated HRTF is identified for the virtual space of the computer game. The virtual space HRTF may model a neutral HRTF with no people in the space for the space and may be provided by the game developer. In an example, the game developer may create his or her own HRTF for the game space or may use a pre-created HRTF for a real space such as a physical space (for instance, an arena) being emulated by the game space.

When a virtual space HRTF has been identified, at block 1002 it is concatenated with each user-personalized FIR filter selected at block 906 corresponding to the poses of the respective game participants. In some examples, the game console or other game source may down-render N-channel (N≥3) game audio at block 1004 to stereo and then the concatenation of virtual space and player HRTF for each game participant is convoluted with the stereo at block 1006 to render as many filtered stereo versions of the audio as there game participants, with each filtered stereo version being produced by concatenating the virtual space HRTF with the respective game participant HRTF. Example techniques for down-rendering and up-rendering are further described in the above-referenced U.S. Pat. Nos. 9,826,332 and 9,924,291.

Proceeding to block 1008, the respective filtered stereo for each participant is sent from the game console or other source to the respective playback device for each player. When N channels have been down-rendered at block 1004, if desired the stereo may be up-rendered at block 1010 back to N-channel, particularly when the playback device has N-channel playback capability. If desired, however, only stereo need be played back. In any case, as each participant moves to a new pose/orientation, this is identified at block 1012 and the process continues by looping to block 1000.

Note that the logic may not use all of the taps of the FIR filter selected at block 906. In some implementations the user may be enabled to select the number of taps to use, it being understood that the greater the number of taps, the better the fidelity but the more burdensome the processing. Or, the playback device 42 may be limited as to how many taps it can process, and therefore may automatically use only some, but not all, of the FIR taps. For example, if a FIR filter has 64 taps but the playback device can process only 32 taps, the playback device may select every other tap in the FIR filter to use, discarding the rest.

Note that if a user's head is at an orientation that itself is not exactly correlated with a FIR filter but hat is between two orientations that are correlated with respective FIR filters, the FIR filter of the orientation closest to the actual orientation may be used. Or, the coefficients of each of "N" corresponding taps of the adjacent FIR filters may be averaged in a weighted manner and a new FIR filter generated on the fly with the averaged coefficients. For example, if the coefficient of the $N^{th}$ tap of the filter associated with the orientation immediately to the left of the user's current orientation is "A", the coefficient of the $N^h$ tap of the filter associated with the orientation immediately to the right of the user's current orientation is "A", and the user's current orientation is exactly midway between the filter orientations, then the coefficient of the $N^{th}$ tap of a new FIR filter generated on the fly would be (A+B)/2. If the user's current orientation is 40% of the way from the "A" orientation and thus 60% of the way from the "B" orientation, the coefficient of the $N^{th}$ tap of a new FIR filter generated on the fly would be (0.6A+0.4B).

Figure 11:
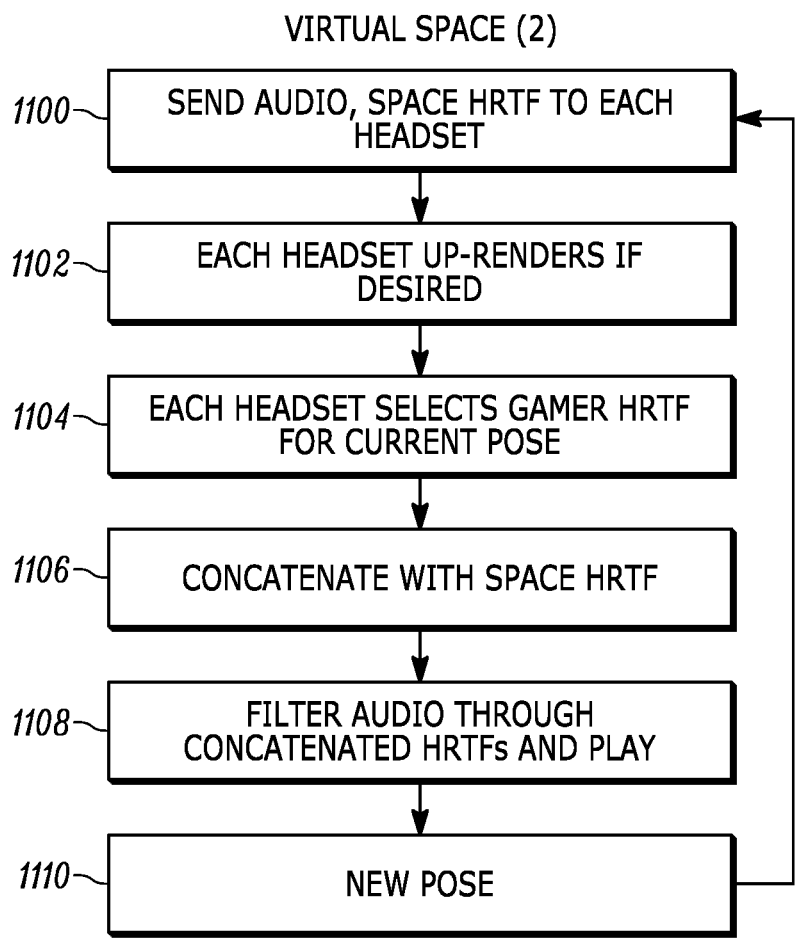
FIG. 11 is a flow chart of example logic continuing from FIG. 9 that is game headset-centric for a computer game space.

FIG. 11 illustrates alternate logic in which the participant's playback device such as the headset may implement some or all of the logic described above. Commencing at block 1100, the game console or other game source may send the game audio and space HRTF to each playback device, e.g., to each headset. Moving to block 1102, the playback device may up-render the audio if desired, assuming it is received in stereo, and then select a participant HRTF corresponding to the current pose of the participant at block 1104. The playback device may concatenate the participant HRTF with the space HRTF at block 1106 and convolute the audio from block 1102 with the concatenation of HRTFs from block 1106 at block 1108. The audio is then played on the playback device. As new participant pose information is received at block 1110, the logic may return to block 1102.

Figure 12:
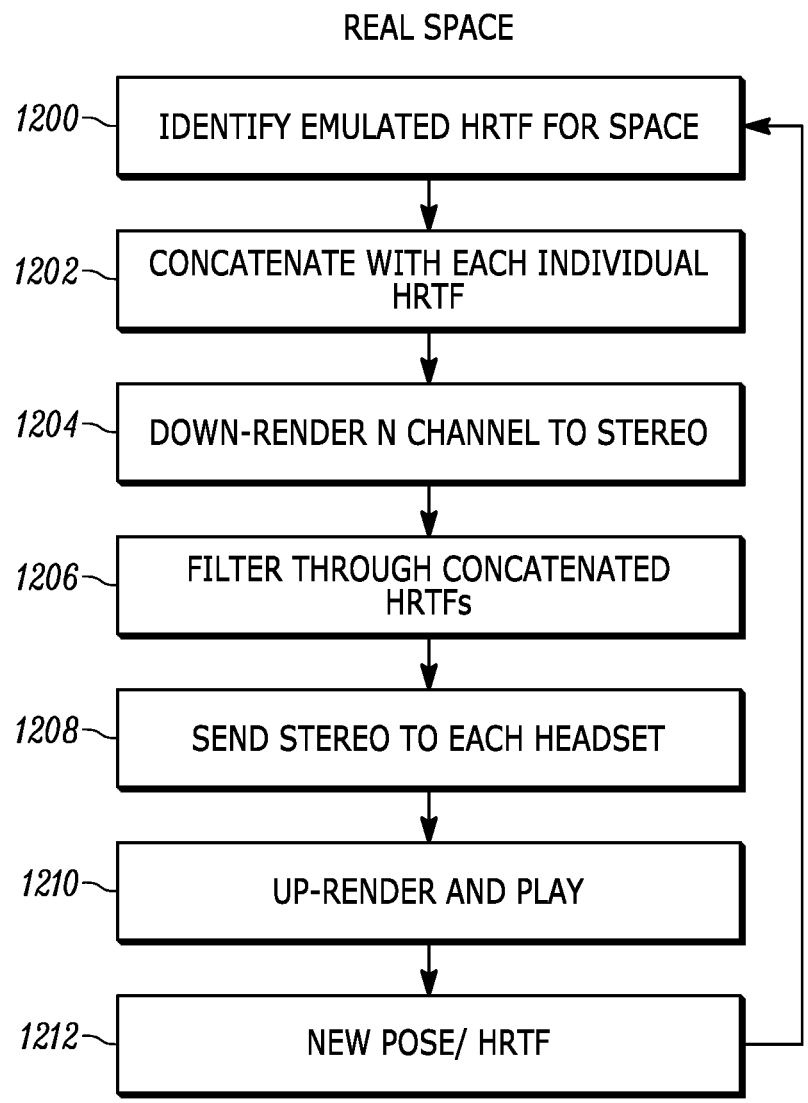
FIG. 12 is a flow chart of example logic continuing from FIG. 9 that is game console-centric for a physical space.
Figure 13:
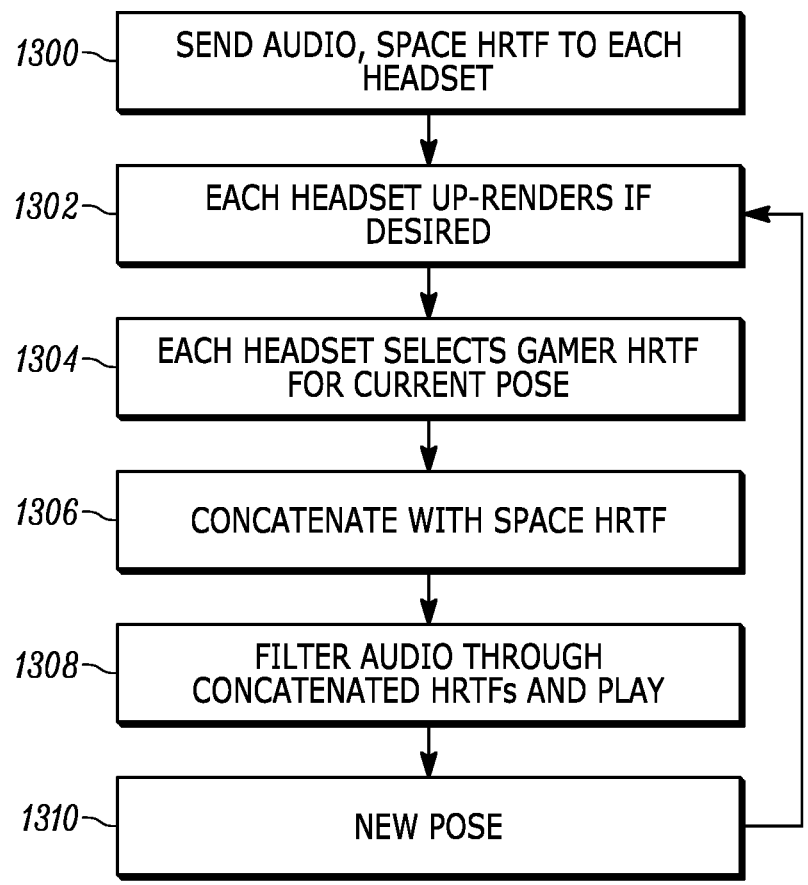
FIG. 13 is a flow chart of example logic continuing from FIG. 9 that is game headset-centric for a physical space.

FIGS. 12 and 13 illustrate logic similar to that shown in FIGS. 10 and 11, respectively, except FIGS. 12 and 13 assume that multiple participants are playing a computer game together in a physical space or spaces to be modeled with a physical space HRTF.

At block 1200 a HRTF is identified for the physical space in which the participants are playing. The physical space HRTF may be a default HRTF assuming no people in the space for the space, and may be provided by the game developer. In an example, the game developer may access a physical space HRTF that has been measured using principles disclosed herein and in the relevant incorporated documents.

When a physical space HRTF has been identified, at block 1202 it is concatenated with each user-personalized FIR filter selected above corresponding to the poses of the respective game participants. In some examples, the game console or other game source may down-render N-channel (N≥3) game audio at block 1204 to stereo and then the concatenation of physical space and player HRTF for each game participant is convoluted with the stereo at block 1206 to render as many filtered stereo versions of the audio as there game participants, with each filtered stereo version being produced by concatenating the physical space HRTF with the respective game participant HRTF.

Proceeding to block 1208, the respective filtered stereo for each participant is sent from the game console or other source to the respective playback device for each player. When N channels have been down-rendered at block 1204, if desired the stereo may be up-rendered at block 1210 back to N-channel, particularly when the playback device has N-channel playback capability. If desired, however, only stereo need be played back. In any case, as each participant moves to a new pose/orientation, this is identified at block 1212 and the process continues by looping to block 1200.

FIG. 13 illustrates alternate logic in which the participant's playback device such as the headset may implement some of the logic described above. Commencing at block 1300, the game console or other game source may send the game audio and physical space HRTF to each playback device, e.g., to each headset. Moving to block 1302, the playback device may up-render the audio if desired, assuming it is received in stereo, and then select a participant HRTF corresponding to the current pose of the participant at block 1304. The playback device may concatenate the participant HRTF with the space HRTF at block 1306 and convolute the audio from block 1302 with the concatenation of HRTFs from block 1306 at block 1308. The audio is then played on the playback device. As new participant pose information is received at block 1310, the logic may return to block 1302.

Figure 14:
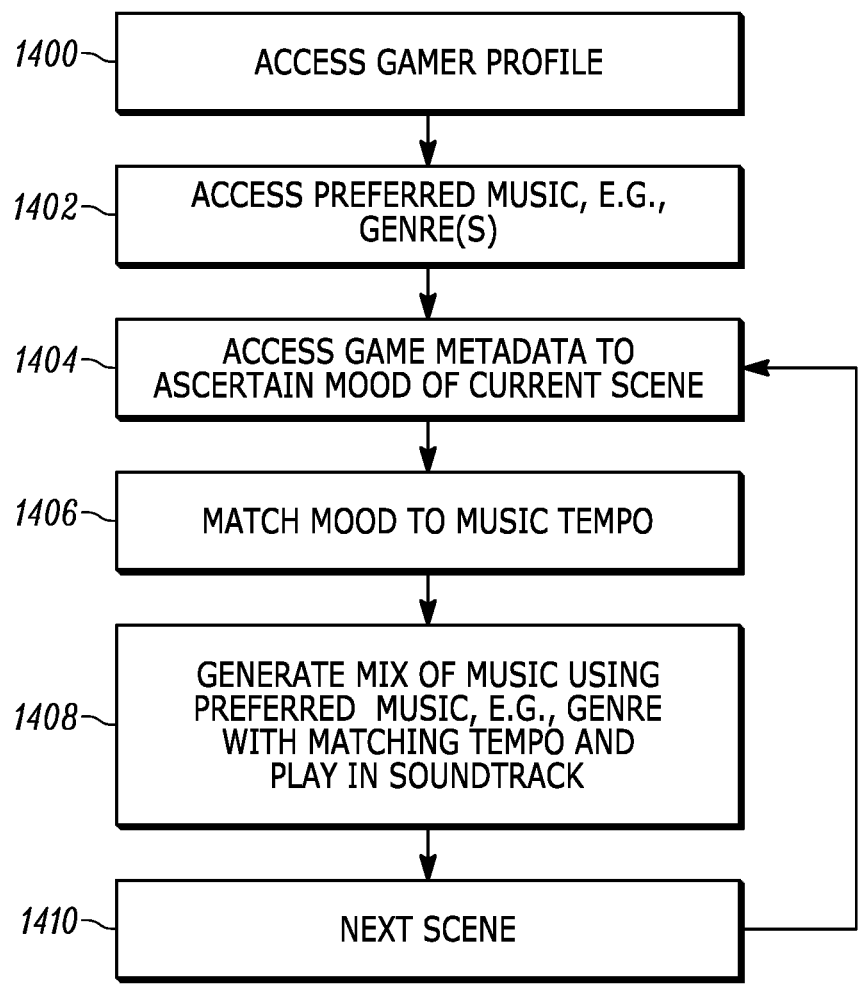
FIG. 14 is a flow chart of example logic for personalizing a gamer's listening experience while playing a computer game by using music of genres from the gamer's profile.

FIG. 14 illustrates a technique for personalizing the audio track of a computer game using music personalized to the gamer. Information pertaining to preferred music of a computer game player ("gamer") is accessed by, e.g., accessing a profile of the gamer at block 1400. Typically, such profiles are accessible to computer game software executing on the cloud and/or on a game console. From the profile, music such as one or more types (or genres) of music as may have been entered by the gamer into his profile or learning from gamer music play by a machine learning algorithm are identified at block 1402. During game execution, tempo information of the game is identified. In an example, this may be done at block 1404 by identifying a tempo or tempo range from game metadata, it being understood that other means for identifying tempo characterizing the current scene of the game being presented may be used, e.g., histograms, motion vectors, etc. In the example shown, metadata may indicate a "mood" at block 1404 which is correlated to a tempo at block 1406, e.g., upbeat mood or excited mood may correlate to higher tempos then a romantic scene mood.

Proceeding to block 1408, a mix of typically plural music titles in sequence or only one music title is generated for mixing into the audio track of the game and played on speakers, e.g., of a playback device such as a TV communicating with a game console. This is done in the example shown by identifying music tracks in the personalized genre from block 1402 with tempos approximating that of the game identified at block 1406. The personalized music mix is thus created and played in some embodiments on the fly. When a next scene is identified at block 1410, the logic loops back to block 1404, so that the tempo of the personalized mix can change as the game changes to reflect the mood of the game scene being presented.

While the particular embodiments are herein shown and described in detail, it is to be understood that the subject matter which is encompassed by the present invention is limited only by the claims.

What is claimed is:

1. A device comprising:
   at least one computer medium that is not a transitory signal and that comprises instructions executable by at least one processor to:
   access at least a first set of head related transfer functions (HRTF) each HRTF being associated with a pose, the first set of HRTF comprising plural finite impulse response (FIR) filters, each of which includes plural taps, with at least some of the plural taps being associated with a respective coefficient;
   identify a first HRTF of the first set of HRTF based at least in part on a pose of a body;
   concatenate the first HRTF with a HRTF associated with a space to render a concatenated HRTF;
   convolute the audio stream using the concatenated HRTF to render a first adjusted stream; and
   provide the first adjusted stream to at least one audio speaker of a first playback device.

2. The system of claim 1, wherein the first set of HRTF is for a first ear of a first person, the at least one audio speaker is a first speaker, the first adjusted stream is a first ear adjusted stream, and the instructions are executable to:
   access at least a second set of HRTF tailored to the first person, each HRTF in the second set tailored to the first person being associated with a pose of the first person;
   identify a first one of the second set tailored to the first person based at least in part on the identification of the pose of the first person;
   convolute the audio stream using the first one of the second set tailored to the first person to render a second ear adjusted stream; and play the second ear adjusted stream on at least one second audio speaker.

3. The system of claim 1, comprising the processor and the at least one speaker.

4. The system of claim 1, wherein the instructions are executable to:
   access at least a second set of HRTF tailored to a second person, each HRTF being associated with a pose of the second person;
   identify a pose of the second person;

identify a first HRTF of the second set of HRTF based at least in part on the identification of the pose of the second person;

convolute the audio stream using the first HRTF of the second set of HRTF to render a second adjusted stream; and provide the second adjusted stream on at least one audio speaker of a second playback device associated with the second person.

5. The system of claim 1, wherein the space is a virtual space of a computer game.

6. The system of claim 1, wherein the space is a physical space.

7. The system of claim 1, wherein the computer medium is in a game source.

8. The system of claim 7, wherein the game source comprises a game console.

9. The system of claim 1, wherein the at least one computer medium comprises at least a first computer medium in the first playback device, and the instructions of the first computer medium are executable to:

access at least the first set of HRTF, identify the pose of the first person, identify the first HRTF of the first set of HRTF, convolute the audio stream using the first HRTF of the first set of HRTF to render the first adjusted stream, and play the first adjusted stream on at least one audio speaker of the first playback device.

10. The system of claim 4, wherein the at least one computer medium comprises at least a second computer medium in the second playback device and wherein the instructions of the second computer medium are executable to:

access at least the second set of HRTF, identify the pose of the second person, identify the first HRTF of the second set of HRTF, convolute the audio stream using the first HRTF of the second set of HRTF to render the second adjusted stream, and play the second adjusted stream on at least one audio speaker of the second playback device.

11. A system comprising:

at least one computerized first playback device having at least one audio speaker; and at least one computer medium that is not a transitory signal and that comprises instructions executable by at least one processor to:

access at least a first set of head related transfer functions (HRTF) tailored to a first person, each HRTF being associated with a pose of the first person, the first set of HRTF comprising plural finite impulse response (FIR) filters, each of which includes plural taps, with each tap being associated with a respective coefficient;

identify a pose of the first person;

identify a first HRTF of the first set of HRTF based at least in part on the identification of the pose of the first person;

combine the first HRTF with a HRTF associated with a space to render a combined HRTF;

convolute the audio stream using the combined HRTF to render a first adjusted stream; and provide the first adjusted stream to the at least one audio speaker of the first playback device.

12. The system of claim 11, wherein the first set of HRTF is for a first ear of the first person, the at least one audio speaker is a first speaker, the first adjusted stream is a first ear adjusted stream, and the instructions are executable to:

access at least a second set of HRTF tailored to the first person, each HRTF in the second set tailored to the first person being associated with a pose of the first person;

identify a first one of the second set tailored to the first person based at least in part on the identification of the pose of the first person;

convolute the audio stream using the first one of the second set tailored to the first person to render a second ear adjusted stream; and play the second ear adjusted stream on at least one second audio speaker.

13. The system of claim 11, comprising the processor.

14. The system of claim 11, wherein the instructions are executable to:

access at least a second set of HRTF tailored to a second person, each HRTF being associated with a pose of the second person;

identify a pose of the second person;

identify a first HRTF of the second set of HRTF based at least in part on the identification of the pose of the second person;

convolute the audio stream using the first HRTF of the second set of HRTF to render a second adjusted stream, and provide the second adjusted stream on at least one audio speaker of a second playback device.

15. The system of claim 11, wherein the space is a virtual space of a computer game.

16. The system of claim 11, wherein the space is a physical space.

17. A method comprising:

accessing at least a first set of head related transfer functions (HRTF) tailored to a first person, each HRTF being associated with a pose of the first person, the first set of HRTF comprising plural finite impulse response (FIR) filters, each of which includes plural taps, with each tap being associated with a respective coefficient;

identifying a pose of the first person;

identifying a first HRTF of the first set of HRTF based at least in part on the identification of the pose of the first person;

combining the first HRTF with a HRTF associated with a space to render a combined HRTF;

convoluting the audio stream using the combined HRTF to render a first adjusted stream; and providing the first adjusted stream to at least one audio speaker of a first playback device.

18. The method of claim 17, wherein the first set of HRTF is for a first ear of the first person, the at least one audio speaker is a first speaker, the first adjusted stream is a first ear adjusted stream, and the method comprises:

accessing at least a second set of HRTF tailored to the first person, each HRTF in the second set tailored to the first person being associated with a pose of the first person;

identifying a first one of the second set tailored to the first person based at least in part on the identification of the pose of the first person;

convoluting the audio stream using the first one of the second set tailored to the first person to render a second ear adjusted stream; and playing the second ear adjusted stream on at least one second audio speaker.

19. The method of claim 17, comprising:

accessing at least a second set of HRTF tailored to a second person, each HRTF being associated with a pose of the second person;

identifying a pose of the second person;

identifying a first HRTF of the second set of HRTF based at least in part on the identification of the pose of the second person;

convoluting the audio stream using the first HRTF of the second set of HRTF to render a second adjusted stream; and providing the second adjusted stream on at least one audio speaker of a second playback device.

20. The method of claim 17, wherein the space is a virtual space of a computer game.

21. The method of claim 17, wherein the space is a physical space.

* * * * *